United States Patent Office 3,346,536
Patented Oct. 10, 1967

3,346,536
PVC RESIN CONTAINING A KETO ACETIC (A) ACID ESTER OR (B) ANHYDRIDE, AND A METAL (A) PHENOLATE OR (B) CARBOXYLIC ACID SALT
Otto S. Kauder, Jamaica, and Norman L. Perry, Baldwin, N.Y., assignors to Argus Chemical Corporation, Brooklyn, N.Y., a corporation of New York
No Drawing. Filed Jan. 22, 1964, Ser. No. 339,344
16 Claims. (Cl. 260—45.85)

This invention relates to new stabilizer compositions for polyvinyl chloride resins and to polyvinyl chloride resin compositions having an improved color and better clarity, incorporating such stabilizer compositions. More particularly this invention relates to new stabilizer compositions for polyvinyl chloride resins comprising a keto acetic acid compound and a metal salt of an organic acid, and to polyvinyl chloride resin compositions having excellent heat stability and improved clarity stabilized by means of such stabilizing combinations.

U.S. Patent No. 2,564,646 to Leistner, Hecker and Knoepke suggests the stabilization of polyvinyl chloride resins using a heavy metal salt of a higher fatty acid, and with this stabilizer there is also incorporated an organic phosphite which serves as an anti-clouding agent retarding precipitation of metal halide from the stabilizer resin composition as a cloud or haze in the stock. The phosphites disclosed include primary, secondary and tertiary alkyl and aryl phosphites. Supplementing this disclosure it has also been disclosed by Leistner and Hecker in U.S. Patent No. 2,716,092 that an improved stabilizer is obtained using in combination with such phosphites polyvalent metal salts of hydrocarbon-substituted phenols. These compositions are now widely used for the stabilization of polyvinyl chloride resins against discoloration during processing and against blooming due to separation of ingredients from the resin.

U.S. Patent No. 2,711,401 to Lally proposed the stabilization of polyvinyl chloride resins with a combination of polyol with certain polyvalent metal salts of organic acids. However, as is pointed out in U.S. Patents Nos. 3,003,998, 3,003,999 and 3,004,000, these stabilizer combinations are not sufficiently effective at 375° F. and higher, the elevated processing temperatures required for rigid polymers.

In many cases, polyvinyl chloride resins in the course of compounding at elevated temperatures and before the compounded composition has been heated for any length of time develop a faint yellow color and lose clarity. This initial discoloration and opacification has not been considered disadvantageous heretofore for many uses, and the above-mentioned workers have consequently devoted their efforts to minimizing intensification of this discoloration during long heating, as in milling. However, because of this initial discoloration, it has not been possible in all cases to obtain a substantially clear and colorless polyvinyl chloride composition. Hansen et al., for example, in their Patent No. 2,867,594, regarded it as a considerable improvement when, as shown in Example 3, the resin turns only very light yellow after fifteen minutes of heating. Obviously, a considerable improvement would be had if it would be possible to obtain a resin which is still clear and has no noticeable yellowish or other discoloration after fifteen minutes of heating at temperatures of the order of 350° F. Even if such compositions proved less stable in long term heating, a composition not as stable as the prior compositions to extended heating at high temperatures would nonetheless have certain definite advantages if it were not discolored during short term heating at such temperatures.

Recent developments in the vinyl resin stabilizer art have resulted in additives which are nontoxic and useful to the food packaging industry. Only certain tested materials which have been found to be completely nonmigratory or non-toxic may be used as plasticizers or additives for resin compositions used in the food packaging art. Examples of these new types of nontoxic stabilizers may be found in U.S. Patents Nos. 3,003,998, 3,003,999 and 3,004,000. These developments, which include the mixture of the fatty acid salts of magnesium, zinc, calcium, etc. with a polyhydric alcohol do not however have the clarity needed to satisfy some users of the finished material.

In accordance with the instant invention, it has been determined that polyvinyl chloride resin compositions of excellent initial color and clarity which show substantially no discoloration or cloudiness even after fifteen minutes of heating at 350° F. and below are obtainable if there is incorporated in the resin a stabilizer combination comprising as the essential ingredients a keto acetic acid compound, which can be an ester or an acid anhydride dimer thereof, and a metal salt of an organic acid. Only very small amounts of this combination are required to achieve this improvement in stabilization against discoloration, and amounts within the range from 0.005 to 5 parts per 100 parts of the resin are usually sufficient.

In accordance with the instant invention, polyvinyl chloride resins safe for use in food packaging can be obtained, using nontoxic keto acetic acid compounds and nontoxic metal salts. Such nontoxic compositions have a remarkable heat stability and clarity even at the elevated temperatures of 375° F. and higher required for processing rigid polyvinyl chloride resins.

The keto acetic acid compound should be nonvolatile and stable at processing temperatures. It should also be nitrogen-free. In general, compounds having at least eight carbon atoms in the molecule fulfill these requirements. The free keto acetic acids, for some reason that is unknown, do not possess the stabilizing effectiveness of the esters or of the anhydride dimers. However, metal salts of these keto acids can be used as the metal salt component of the stabilizer combination of the invention, and in combination with the ester and/or anhydride dimer have excellent stabilizing effectiveness.

The keto acetic acid esters of this invention have the following general formula:

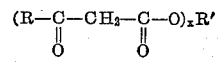

wherein R is an inert organic group having from one to about thirty carbon atoms, R' is an inert organic radical having from one to about thirty carbon atoms, and $x$ is a number from one to ten. The ester molecule has a total of at least eight carbon atoms.

R and R' can be hydrocarbon groups, and can be alkyl, alkenyl, aryl, alkylaryl, aryl alkyl, cycloalkyl, cycloalkenyl, and heterocyclic. The open chain groups can be straight or branched, and the cyclic and alicyclic groups can be saturated or unsaturated. The R and R' groups can also be substituted by inert groups such as halogen (fluorine, chlorine, bromine and iodine) alkoxy or epoxy

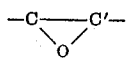

hydroxy OH and ether ≡C—O—C≡ groups. There will not usually be more than ten of such substitutents, depending of course upon the number of available substituent positions in the R and R' groups.

Thus, the R' radical for example can include free hydroxyl OH groups, up to a practical maximum of ten, but generally not more than one hydroxyl group per carbon atom, and the R' radical can carry a plurality of

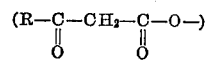

ester groups, up to a total of about ten, the value of $x$. It will be understood that where R' has more than one OH group, the value of $x$ represents only an average value of the number of possible ester species that may exist, dependent on the total number of OH groups on R'. For instance, in the case of a di-ester ($x=2$), where R' has three free OH groups, there can also be pentaester, tetraester, triester and monoester species present. Indeed, in such cases, $x$ can be a decimal number, for instance, 2.5, indicating the presence of a mixture of monoester, diester, triester and higher ester species in porportions to give this average value for $x$. Those skilled in the art will perceive the increased possibilities as $x$ increases to ten or more.

Exemplary R and R' hydrocarbon groups are methyl, ethyl, n-propyl, isopropyl, n-butyl, isobutyl, sec-butyl, tert-butyl, n-amyl, iso-amyl, tert-amyl, hexyl, heptyl, tert-octyl, 2-ethyl hexyl, isononyl, decyl, undecyl, dodecyl, palmityl, stearyl, oleyl, ricinoleyl, linoleyl, linolenyl, behenyl, tridecyl, phenyl, xylyl, tolyl, naphthyl, cylohexyl, methyl-cyclohexyl, cyclopentyl, tetrahydrofurfuryl, cycloheptyl, isononylphenyl, furyl, and pyranyl.

Exemplary hydroxy-substituted R' groups include hydroxyethyl, 2-hydroxypropyl, 3-hydroxypropyl, 1-hydroxyamyl, 2-hydroxyamyl, 2,2-dimethylol propyl, 2,2-dihydroxyamyl, 1,1-methylol hydroxybutyl, 2-(di-hydroxy ethyl)-butyl, 1-(dihydroxy ethyl) propyl, 3-4 dihydroxyheptyl, 4-5 dihydroxyoctyl, 7,8-dihydroxyhepta-decyl, 1,2,3-dihydroxytetradecyl, 1,2,3,4,5,6-hexahydroxy heptyl, 10-hydroxyeicosyl, 2,3-dihydroxypropyl, 4-hydroxybutyl, 3,4-dihydroxybutyl, 2,3,4-trihydroxybutyl, 1,3,4-trihydroxybutyl.

These esters are readily prepared according to known procedures by transesterification of a simple ester of the corresponding keto acetic acid, such as ethyl acetoacetate, with the corresponding alcohol. If the corresponding keto acetic acid is stable, direct esterification is possible. If a polyhydric alcohol is used, mixed esters of the acid and alcohol are obtained, according to the molar proportions of each, and mixtures of the various possible esters will also be present in most case.

Typical esters are:

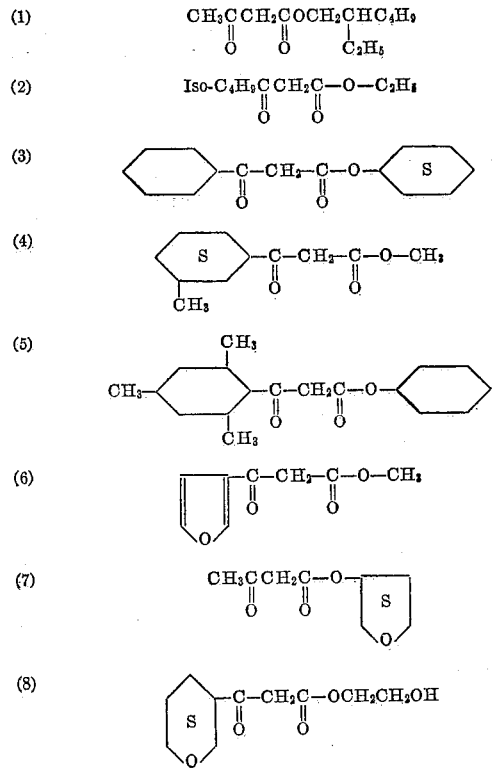

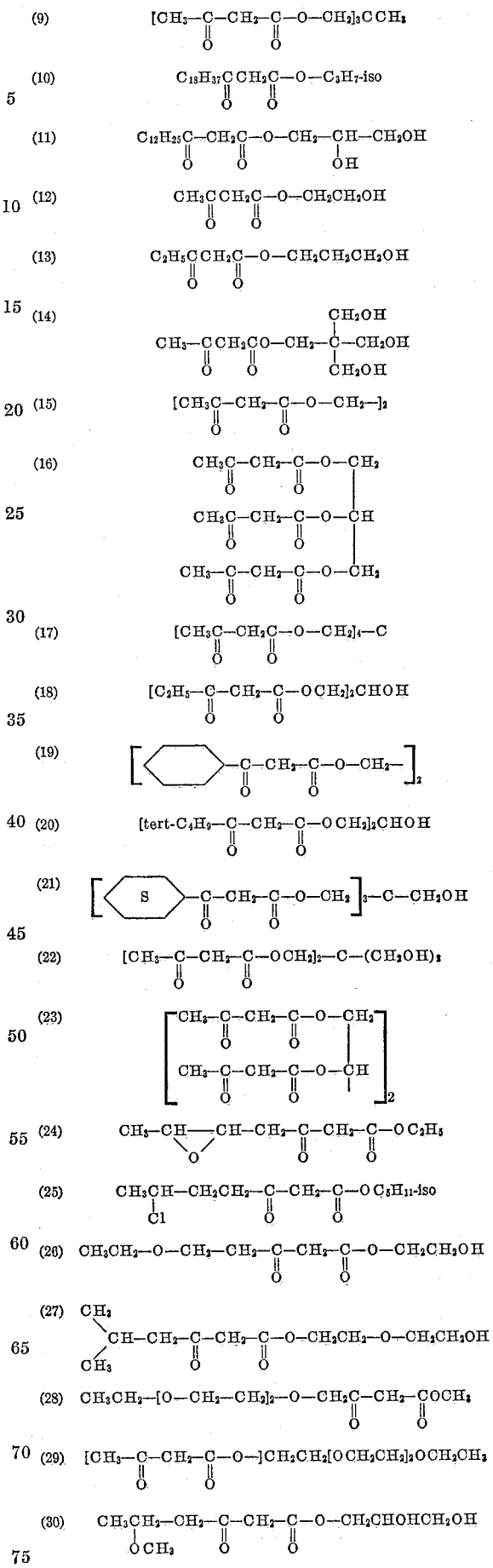

The keto acid anhydride dimers have the formula:

I. (a) 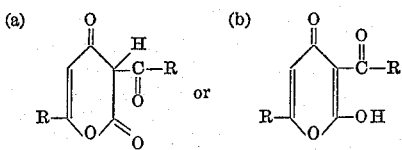 or (b)

II. 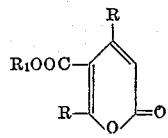

R is again as above and $R_1$ is hydrogen or R'.

Exemplary are dehydroacetic acid, isodehydroacetic acid, dehydropropionyl acetic acid, dehydrobenzoyl acetic acid, isodehydro-3,4-dichlorobenzoylacetic acid, and esters of isodehydroacetic acid such as the methyl, ethyl, n-butyl 2-ethyl hexyl and glyceryl esters.

The organic acid anion of the metal salt component will ordinarily have from about six to about twenty-four carbon atoms. The metal can be any alkali or alkaline earth metal of Group I or Group II of the Periodic Table, such as sodium, potassium, lithium, calcium, barium, magnesium and strontium. The acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with non-reactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have non-reactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxycapric acid, ethyl acetoacetic acid, benzoic acid, phenylacetic acid, butylbenzoic acid, ethylbenzoic acid, propylbenzoic acid, hexylbenzoic acid, salicylic acid, naphthoic acid, 1-naphthalene-acetic acid, orthobenzoyl benzoic acid, naphthenic acids derived from petroleum, abietic acid, dihydroabietic acid, hexahydrobenzoic acid, and methyl furoic acid, as well as partially esterified dibasic acids such as monobutyl phthalate, isooctyl maleate, ethylene glycol maleate, and 2-ethoxy ethylmaleate.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

In combination with the above metal salts of organic acids, or in lieu thereof, a metal salt of a hydrocarbon-substituted phenol can be used. The hydrocarbon substituents contain from four to twenty-four carbon atoms each. The metal can be an alkali metal or alkaline earth metal such as sodium, potassium, lithium, calcium, strontium, magnesium and barium. Among such polyvalent metal phenolates there can be mentioned the magnesium, barium, calcium, strontium, cadmium, lead, tin and zinc salts of n-butyl phenol, isoamyl phenol, isooctyl phenol, 2-ethylhexyl phenol, t-nonyl phenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, di-t-dodecyl phenol, ortho or para phenyl phenol. The metal phenolate should be compatible with the chlorine-containing resin.

Mixtures of salts of various metals can be used, and many such mixtures are known to give enhanced effects, such as mixed zinc, cadmium, tin, lead, antimony, manganese, bismuth, iron, cobalt, nickel, and copper salts with the alkali metal or alkaline earth metal salts, e.g., potassium and zinc stearates, as in U.S. Patent No. 2,446,976, and mixed cadmium, lead or calcium and alkali metal salts such as sodium and potassium, as in U.S. Patent No. 2,181,478.

Usually, only a relatively small proportion of the new stabilizer combination gives a noticeable improvement in clarity. The usual amounts employed, based on total weight of resin, are within the range from about 0.005 to 5%, preferably 0.05 to 2%. The larger amounts, while generally not detrimental to the quality of the product, will be wasteful.

The invention is applicable to any polyvinyl chloride resin. The term "polyvinyl chloride" as used herein is inclusive of any polymer formed at least in part of the recurring group,

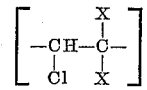

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides as a class, for example, those disclosed in British Patent No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The invention also is applicable to mixtures of polyvinyl chloride in a major proportion with a minor proportion of other synthetic resins such as chlorinated polyethylene or a copolymer of acrylonitrile, butadiene and styrene.

The invention is of application to the stabilization of rigid polyvinyl chloride resin compositions, that is, resin compositions which are formulated to withstand high processing temperatures, of the order of 375° F. and higher, and of plasticized polyvinyl chloride resin compositions of conventional formulation where resistance to heat distortion is not a requisite. The respective definitions of rigid and plasticized resins are as follows. The rigid resins are those resins to which plasticizers are not added, and which are generally worked at 375° F. The ASTM definition (1961 D–883, Part 9, page 804) is as follows: "a plastic which has a stiffness or apparent modulus of elasticity greater than 7000 grams per square centimeter (100,000 p.s.i.) at 23° C." The plasticized resin would therefore have a modulus of elasticity of less than 7000 grams per square centimeter, and would have added to it the plasticizer compound. Conventional plasticizers well known to those skilled in the art can be employed such as, for example, dioctyl phthalate, octyl diphenyl phosphate and epoxidized soybean oil.

Particularly useful plasticizers are the epoxy higher esters having from 22 to 150 carbon atoms. Such esters will initially have had unsaturation in the alcohol or acid portion of the molecule, which is taken up by the formation of the epoxy group.

Typical unsaturated acids are acrylic, oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cotton-seed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

The keto acetic acid compounds of the invention can, if desired, be employed in conjunction with other stabilizers for polyvinyl chloride resins, although, in most cases, the stabilization imparted by the keto acetic acid compound will be sufficient. In some cases, however, for particular end uses, special stabilization effects may be desired.

The stabilizer combinations of this invention are effective in improving clarity of polyvinyl chloride resins in the absence of any other additives. However, it has long been recognized that polyvinyl chloride resins containing several types of heat stabilizers are better protected than those containing only one heat stabilizer. It is therefore an important aspect of this invention that these stabilizer combinations when used with additional heat stabilizers, provide greatly improved resistance to heat degradation not obtainable with the other heat stabilizers alone.

Many heat stabilizers are known to the art. Among the more important heat stabilizers in commercial use are mild alkalis such as sodium carbonate, disodium phosphate, and sodium and potassium salts of partially esterified phosphoric acids; inorganic and organic lead salts; organotin carboxylates, as disclosed by Quattlebaum in U.S. Patent No. 2,307,157; organotin mercaptides as disclosed by Leistner in U.S. Patents Nos. 2,641,588 and 2,641,596; various metal-free organic compounds such as the polyols, e.g., mannitol, sorbitol, glycerol, pentaerythritol, 1,2-epoxides, e.g., soybean oil epoxide, isooctyl epoxystearate, and the diglycidyl ether of 2,2-bis(p-hydroxyphenyl)propane, and nitrogen compounds, e.g., phenylurea, N,N'-diphenyl-thiourea, and 2-phenylindole. For detailed discussion of heat stabilizers for vinyl halide resins, reference may be made to the articles by N. L. Perry "Barium-Cadmium Stabilization of Polyvinyl Chloride," Rubber Age 85, 449–452 (June 1959) and by H. Verity-Smith, British Plastics 27, 176–179, 213–217, 307–311 (1954), the brochure by the same author The Development of the Organotin Stabilizer (Tin Research Institute, 1959) and the book La Stabilization des Chlorures de Polyvinyle by F. Chevassus (Amphora, Paris, 1957).

Preferred classes of additional heat stabilizers which can be used include the phenols and the organic triphosphites and acid phosphites.

The phenol stabilizers contain one or more phenolic hydroxyl groups, and can contain one or more phenolic nuclei. In adition, the phenolic nucleus can contain an oxy or thio ether group. The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with the resin, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one, or in the same or different rings, if there are more than one. In the case of bicyclic phenols, the rings can be linked by thio or oxyether groups, or by alkylene, alicyclidene or arylidene groups. Such phenols, which are preferred because of their superior stabilizing action, can be defined by the formula:

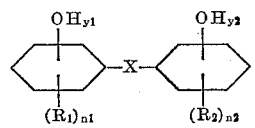

where X is an oxygen or sulfur atom, or an alkylene or alicyclidene or arylene or a mixed alkylene-alicyclidene or alkylene-arylidene group, having a straight or branched chain, whose total number of carbon atoms ranges from one to about eighteen, $y1$ and $y2$ are the number of phenolic hydroxyl groups OH, $n1$ and $n2$ are the number of R groups, and $R_1$ and $R_2$ are hydrogen or alkyl of one to about eighteen carbon atoms. Preferably, the OH groups are ortho and/or para to X.

The sum of $y$ and $n$ in each ring cannot, of course, exceed five.

Typical X groups are

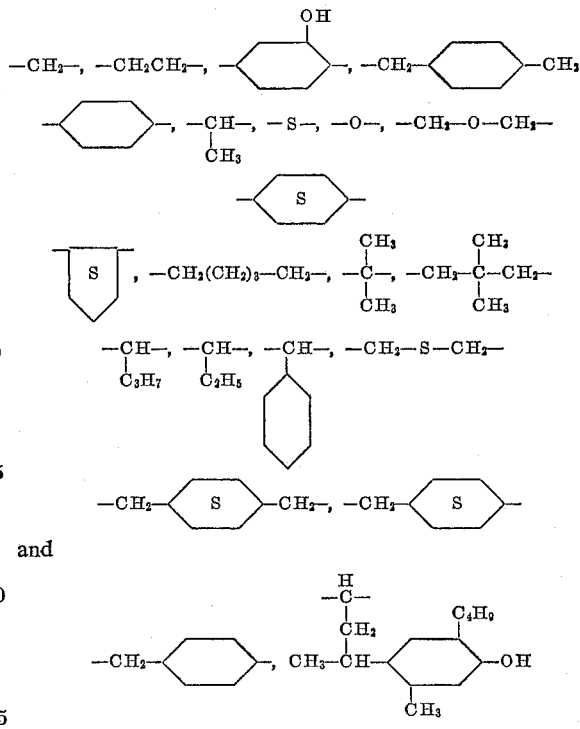

and

The various X and R groups are exemplified in the following compounds.

Exemplary of satisfactory monohydric phenols are 2,6-di-tertiary-butyl-4-methyl phenol, 2-tertiary-butyl-4-methoxy phenol, nonyl phenol, dodecyl phenol, dinonyl phenol, phenyl phenol, tetradecyl phenol, and tetrahydro-α-naphthol.

Exemplary polyhydric phenols are orcinol, propyl gallate, catechol, resorcinol, 4-octyl resorcinol, 4-dodecyl resorcinol, 4-octadecyl catechol, 4-isooctyl-phloroglucinol, pyrogallol, hexahydroxy benzene, 4-isohexyl-catechol, 2,6-di-tertiary-butyl resorcinol, 2,6-diisopropyl phloroglucinol, methylenebis (2,6-ditertiarybutyl-m-cresol), methylenebis (2,6-ditertiarybutyl-phenol), 2,2-bis(4-hydroxyphenyl) propane, methylenebis (p-cresol), 4,4'-thio-bisphenol, 4,4'-oxobis(3-methyl-6-isopropyl-phenol), 4,4'-thiobis(3-methyl-6-tertiary-butyl-phenol), 2,2' - oxobis(4-dodecyl-phenol), 2,2'-thiobis(4-methyl-6-tertiary - butyl-phenol), 2,6-diisooctyl resorcinol, 4,4'-n-butylidenebis(2 tertiarybutyl-5-methyl-phenol), 4,4'-benzylidenebis(2-tertiarybutyl-5-methyl phenol), 2,2'-methylenebis (4-methyl-6-(1'-methyl-cyclohexyl)-phenol), 4,4'-cyclohexylidenebis (2-tertiarybutyl-phenol), 2,6-bis(2'-hydroxy-3' - tertiarybutyl-5'-methylbenzyl)-4-methylphenol, 4-octyl pyrogallol, and 3,5-ditertiarybutyl catechol.

The triphosphite can be any organic triphosphite having attached to phosphorus through oxygen or sulfur groups selected from aryl, alkyl, cycloalkyl, aralkyl and alkaryl groups, in any combinations, such as, three monovalent groups, $(RA)_3P$; one monovalent group and one bivalent group, forming a heterocyclic ring with the phosphorus,

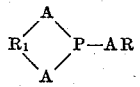

a plurality of bivalent groups forming polymers therewith,

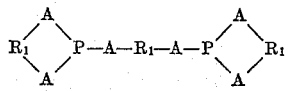

one trivalent group,

and a plurality of trivalent groups forming polymers therewith,

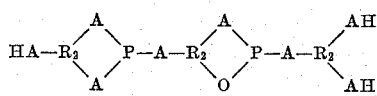

and any combinations of monovalent, bivalent and trivalent groups to form monomeric and polymeric phosphites; wherein A is oxygen or sulfur. The term "organic phosphite triester" as used herein is inclusive of oxo, thio and mixed oxo thio phosphites. Usually, the phosphite will not have more than about sixty carbon atoms.

Exemplary are monophenyl di-2-ethyl hexyl phosphite, diphenyl mono-2-ethyl hexyl phosphite, diisooctyl monotolyl phosphite, tri-2-ethyl hexyl phosphite, phenyl dicyclohexyl phosphite, phenyl diethyl phosphite, triphenyl phosphite, tricresyl phosphite, tri(dimethylphenyl) phosphite, trioctadecyl phosphite, triisoooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl)(isooctyl-phenyl) phosphite, tri(2-cyclohexylphenyl) phosphite, tri-α-naphthyl phosphite, tri(phenylphenyl) phosphite, tri(2-phenyl ethyl) phosphite, tridodecyl thiophosphite, tri-p-tert-butyl phenyl thiophosphite, dodecyl thiodiphenyl phosphite, tert-butyl phenyl thio-di-2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxaphosphorinane, 2-octoxy-5,5-dimethyldioxaphosphorinane and 2-cyclohexyloxy-5,5-diethyldioxaphosphorinane.

Also useful are the acid phosphites disclosed in U.S. Patent No. 2,997,454.

As exemplary of these, there are suggested the following: di(phenyl) phosphite, monophenyl phosphite, mono-(diphenyl) phosphite, dicresyl phosphite, de-(o-isooctylphenyl) phosphite, di(p-2-ethylhexyphenyl) phosphite, di(p-t-octylphenyl) phosphite, di(dimethylphenyl) phosphite, di-n-butyl phosphite, di-2-ethylhexyl phosphite, mono-2-ethyl hexyl phosphite, diisooctyl phosphite, monoisooctyl phosphite, monododecyl phosphite, 2-ethylhexyl phenyl phosphite, 2-ethylhexyl-(n-octylphenyl) phosphite, monocyclohexyl phosphite, dicyclohexyl phosphite, di(2-cyclohexyl phenyl) phosphite, di-α-naphthyl phosphite, diphenyl phenyl phosphite, di(diphenyl) phosphite, di-2-phenyl ethyl) phosphite, dibenzyl phosphite, monobenzyl phosphite, n-butyl cresyl phosphite, didodecyl phosphite, ditetrahydrofurfuryl phosphite and difuryl phosphite.

A total of from 0.5 to 10 parts by weight of the combined stabilizer combination of the invention and adjunct stabilizers can be used for each 100 parts by weight of the resin. More stabilizer composition can be used, but usually no better result is obtained, and therefore such amounts are uneconomical and wasteful.

A small amount, usually not more than 1.5%, of a parting agent, also can be included. Typical parting agents are the higher aliphatic acids having from twelve to twenty-four carbon atoms, such as stearic acid, lauric acid, palmitic acid and myristic acid, mineral lubricating oils, polyvinyl stearate, polyethylene and paraffin wax.

According to a preferred embodiment of the instant invention polyvinyl chloride resins which are safe for use in food packaging and which have remarkable heat stability at elevated temperatures are obtained using, as the adjunct stabilizer with the keto acetic acid compound, nontoxic polyvalent metal salt combination comprising at least one calcium and/or magnesium salt and at least one zinc salt together with a polyol. The anion portion of the calcium and/or magnesium and zinc salts can be derived from benzoic acid and from fatty acids derived from edible fats and oils. Complete details on many such nontoxic stabilizer combinations are given in U.S. Patent Nos. 3,003,998, 3,003,999 and 3,004,000, the disclosures of which are hereby incorporated by reference. This invention thus encompasses stabilizers comprising a keto acetic acid compound, calcium and/or magnesium and zinc benzoates plus a polyol, calcium and/or magnesium and zinc fatty acid salts plus a polyol, and mixtures of calcium and/or magnesium and/or zinc benzoates and magnesium and/or zinc fatty acid salts, plus a polyol. Good stability for long-term heating is imparted by this combination.

Such stabilizer compositions of this invention comprise from about 4 to about 80 parts keto acetic acid compound, from about 25 to about 40 parts of calcium and/or magnesium salts, from about 25 to about 40 parts of zinc salts, and from about 20 to about 80 parts of the polyhydric alcohol. In the case of glycerine, the glycerine preferably is used in the proportion to the zinc salt of at least 2:1, and optimally at least 4:1. It will be understood that the term "salt" refers to the calcium and/or magnesium and zinc salts of benzoic acid and of the fatty acids derived from edible fats and oils. Exemplary are the mixed fatty acids derived from tallow, lard, sardine oil, olive oil, babassu oil, coconut oil, cottonseed oil, soybean oil, corn oil and peanut oil. The oils from which the fatty acids are derived may be hydrogenated, if desired. Also useful are distilled, fractionated fatty acids or mixtures of fatty acids derived from such fats and oils.

Any nontoxic polyols can be employed in such stabilizer compositions of this invention. Thus, any nontoxic aliphatic compounds having at least two and preferably not more than ten hydroxyl groups can be used. Particularly preferred polyols are mannitol, sorbitol and glycerol. Pentaerythritol, dipentaerythritol and tripentaerythritol are effective in the stabilizer compositions of the invention, and can be employed in food packaging operations if and when approval is granted by the appropriate governmental authorities.

The amount of the stabilizer composition added to the resin should be sufficient to permit heating of the stabilized polyvinyl chloride resin composition for the required time without the development of heat decomposition. Usually, from 2 to 6% stabilizer composition by weight of the resin will be sufficient to meet most needs and uses. Sufficient resistance to heat deterioration can be obtained employing only small amounts of the stabilizer composition, for example, about 0.25% by weight of the resin. The more stabilizer employed, the better the resistance to heat deterioration. Amounts beyond about 10% of stabilizer composition are generally unnecessary and hence may be wasteful. Where plasticized resins are being stabilized, less stabilizer is required and usually no more than about 3% by weight of the resin need be used.

The stabilizing effect of such stabilizer compositions of this invention can be enhanced by the addition thereto of small quantities of nontoxic antioxidants. Where such antioxidants are employed, they should not be used in amounts greater than about 0.5% of the resin composition. Any known antioxidant can be employed, provided it is nontoxic in the proportions used. Representative antioxidants include 2,6-di-t-butyl-4-methylphenol, 2-t-butyl-4-methoxyphenol, 3-t-butyl-4-methoxyphenol, n-propyl gallate, n-dodecyl gallate, dilauryl thiodipropionate and nordihydroguaiaretic acid.

The following antioxidants are also believed to be nontoxic in small quantities but have not yet been approved by the appropriate government authorities: 4,4'-methylene bis-(2,6-di-t-butylphenol), 4,4'-thiobis-(2-t-butyl-5-methylphenol), 4,4'-butylidene bis-(2-t-butyl-5-methylphenol), 1,1,3-tris-(3-t-butyl-4-hydroxy-6-methylphenyl)butane, 2,2'-methylene bis - [4 - methyl-6-(1'-methylcyclohexyl)phenol] and 2,2'-methylene bis-(4-nonylphenol).

The preparation of the stabilized composition is easily accomplished by conventional procedures. The selected stabilizer combination ordinarily is mixed with the plasticizer, and this then is blended with the polyvinyl chloride resin, using, for instance, plastic mixing rollers, at a temperature at which the mix is fluid and thorough blending facilitated, milling the plasticizer and stabilizer with the resin on a 2-roll mill at from 250 to 350° F. for a time sufficient to form a homogeneous sheet, five minutes, usually. After the mass is uniform, it is sheeted off in the usual way.

The following examples in the opinion of the inventors represent preferred embodiments of polyvinyl chloride resin compositions of their invention:

*Example 1*

A series of four resin compositions was prepared, each containing 100 parts of Dow 100–4 polyvinyl chloride homopolymer blended with a stabilizer composition made up of (per 100 parts of resin) 45 parts of dioctyl phthalate, 1.5 parts of calcium stearate and the additional ingredients shown in Table I. A fifth sample was then prepared from the Dow PVC formula which omitted the calcium stearate, and substituted for it a sample of 1.5 parts calcium ethyl acetoacetate. Each sample was heated at 350° F. in an air oven to determine heat stability. The color stability of each sample under prolonged heating is shown in Table I. A pressed polished sheet was formed of each sample after being heated for three minutes at 350° F. to show the initial color and clarity of each sample.

TABLE I

| Sample No. | Keto Acetic Acid Component of Stabilizer Composition | Press Polished Sheet Clarity and Color | Heat Discoloration at 350° F. after heating for— | | | | | |
|---|---|---|---|---|---|---|---|---|
| | | | 0 mins. | 15 mins. | 30 mins. | 45 mins. | 60 mins. | 75 mins. |
| 1 | Control I | Pinkish, very slight haze. | Slightly pink | Pale orange | Orange | Reddish color | Dark red with flecks of black. | Very dark red. |
| 2 | Control II [1] | Dark pinkish, cloudy. | Hazy white | Red | Red with dark red splotches. | Dark red with black flecks. | Very dark red. | Do. |
| 3 | 0.25 part dehydro acetic acid. | Clear | Slightly pink | Very pale orange. | Orange | Red | Red | Do. |
| 4 | 1 part 2-ethylhexyl-aceto acetate. | ----do---- | Colorless | Very pale amber. | ----do---- | ----do---- | ----do---- | Do. |
| 5 | 1 part glyceryl tri-acetoacetate. | ----do---- | Slightly yellow | Pale yellow | Light orange | Pale orange | ----do---- | Red. |

[1] 1.5 parts calcium ethylaceto acetate.

From the above table, it may be seen that the composition of this invention containing a keto acetic acid compound shows a significant improvement over the heat stabilizer additive in regard to color and clarity in the earlier stages of heating, and yet the keto acetic acid ester compound is not detrimental to color and clarity over a long heating period. In addition, it is shown that calcium ethylacetoacetate is not a clarity stabilizer, since it is of no help at all in this respect.

*Example 2*

A resin mixture was prepared containing 100 parts of Geon 103 EP polyvinyl chloride homopolymer blended with the stabilizers noted in Table II on a two roll mill at 375° F. Each sample was then divided into two portions, one portion of each being heated at 350° F. and the second portion at 375° F. in an air oven to determine heat stability. In addition, a press polished sheet of each formulation was made by heating for 3 minutes at 375° F. to form the rigid sheet having a 40 mil thickness. The color and clarity of the press polished sheet was compared. Each sample of resin contained 0.67 part each of a mixed zinc and calcium salt of the hydrogenated tallow acids plus 0.67 part of sorbitol. The composition is set forth in U.S. Patent No. 3,003,999. The discoloration was noted and is reported in Table II and Table III.

TABLE II

| Sample No. | Keto-acetic acid component of Stabilizer Composition | Press Polished Sheet Clarity and Color | Heat Discoloration at 350° F. after heating for— | | | | | | | |
|---|---|---|---|---|---|---|---|---|---|---|
| | | | 0 mins. | 15 mins. | 30 mins. | 45 mins. | 60 mins. | 75 mins. | 90 mins. | 105 mins. |
| 1 | Control | Very slight haze and orange. | Pink | Orange | Orange | Orange | Orange | Light orange. | Light orange with spots. | Charred. |
| 2 | 0.25 Part DHAA.[1] | Clear and pale yellow. | Pale pink | Very pale yellow. | Pale yellow. | Pale yellow. | Pale yellow. | ----do---- | ----do---- | Do. |
| 3 | 0.5 part DHAA [1] | Clear and very pale cream. | Very pale pink. | ----do---- | ----do---- | ----do---- | ----do---- | ----do---- | Pale yellow. | Charred. |
| 4 | 0.5 part glyceryl triacetoacetate. | Clear and light yellow. | Very pale yellow. | Pale yellow. | ----do---- | ----do---- | ----do---- | ----do---- | ----do---- | ----do---- |

[1] Dehydro acetic acid.

TABLE III

| Sample No. | Keto-acetic acid component of Stabilizer Composition | Press Polished Sheet Clarity and Color | Heat Discoloration at 375° F. after heating for— | | | | |
|---|---|---|---|---|---|---|---|
| | | | 0 mins. | 15 mins. | 30 mins. | 45 mins. | 60 mins. |
| 1 | Control | Very slight haze and orange. | Pink | Orange | Yellow | Charred | |
| 2 | 0.25 part DHAA [1] | Clear and pale yellow | Pale pink | Light yellow | Yellow and spots | do | |
| 3 | 0.5 part DHAA [1] | Clear and very pale cream. | Very pale pink | do | do | do | |
| 4 | 0.5 part glyceryl triacetoacetate. | Clear and light yellow | Very pale yellow | do | do | do | |

[1] Dehydro acetic acid.

The results of this test show the effectiveness of the additive compositions of this invention for clarifying PVC resin at the working temperatures of both 350° and 375° F. without decreasing the heat stability of the resins over the times required for working.

ond portion at 375° F. in an air oven to determine heat stability. Discoloration was noted and is reported in Table IV and Table V.

TABLE IV

| Sample No. | Keto-acetic acid component of Stabilizer Composition | Initial Clarity and Color | Heat Discoloration at 350° F. after heating for— | | | | | | | | |
|---|---|---|---|---|---|---|---|---|---|---|---|
| | | | 0 mins. | 15 mins. | 30 mins. | 45 mins. | 60 mins. | 75 mins. | 90 mins. | 105 mins. | 120 mins. |
| A | Control | Cloudy and pink. | Very pale pink. | Pale orange. | Light yellow. | Light orange. | Light orange. | Orange | Orange | Orange yellow. | Orange yellow with spots. |
| B | Glycerol 1 part | Cloudy and pale pink. | Colorless. | Cloudy | Yellow | Yellow | Dark yellow. | do | Light yellow. | Light yellow. | Light yellow. |
| C | 1 part 2-ethyl hexyl acetoacetate. | Very slight haze and very pale yellow. | do | Pale yellow. | Pale yellow. | Pale yellow. | Yellow | Yellow | Yellow | Yellow | Edges charred. |
| D | 1 part of mixed glyceryl mono- and di-acetoacetates. | Clear and very pale yellow. | do | Very pale yellow. | Very pale yellow. | do | Pale yellow. | do | do | Edges charred. | Charred. |
| E | 1 part glyceryl triacetoacetate. | do | Very pale yellow. | Pale yellow. | Pale yellow. | do | Yellow | do | do | do | Do. |
| F | 1 part propylene glycol diacetoacetate. | Very light haze and very pale yellow. | do | Very pale yellow. | Very pale yellow. | do | do | do | do | do | Do. |
| G | 1 part dehydroacetic acid. | Clear and almost colorless. | Colorless. | do | Pale yellow. | Yellow | do | do | Charred | do | Do. |

TABLE V

| Sample No. | Keto-acetic acid component of Stabilizer Composition | Initial Clarity and Color | Heat Discoloration at 375° F. after heating for— | | | | |
|---|---|---|---|---|---|---|---|
| | | | 0 mins. | 15 mins. | 30 mins. | 45 mins. | 60 mins. |
| A | Control | Cloudy and pink | Very pale pink. | Light orange. | Yellow | Charred | |
| B | Glycerol 1 part | Cloudy and pale pink | Colorless. | do | do | Edges charred. | Charred. |
| C | 1 part 2-ethyl hexyl acetoacetate | Very slight haze and very pale yellow. | do | Pale yellow. | do | Charred | |
| D | 1 part of mixed glyceryl mono- and di-acetoacetates. | Clear and very pale yellow | do | do | Edges charred. | do | |
| E | 1 part glyceryl triacetoacetate | do | Very pale yellow. | do | Charred | do | |
| F | 1 part propylene glycol diacetoacetate | Very light haze and very pale yellow. | do | do | do | | |
| G | 1 part dehydroacetic acid | Clear and almost colorless | Colorless. | Yellow | do | | |

*Example 3*

A series of resin compositions was prepared each containing 100 parts of Geon 103 EP polyvinyl chloride homopolymer with a stabilizer composition made up of two parts of a 3:4:5 mixture of magnesium benzoate, zinc stearate and mannitol and the additional ingredients shown on Table IV and blended on a two roll mill at 375° F. Each sample was then divided into two portions, one portion of each being heated at 350° F. and the second portion at 375° F. in an air oven to determine heat stability. Discoloration was noted and is reported in Table IV and Table V.

The results of this test show the effectiveness of the compositions of this invention as clarity improvers. They also indicate the ineffectiveness of adding additional pure glycerol to improve clarity. U.S. Patent No. 2,711,401, issued to Lally, discloses the mixture of fatty acid salt and glycerol as an additive. Adding glycerol to the resin containing the mixed salt stabilizer achieves Lally's additive, without the unexpected clarifying effect of this invention.

*Example 4*

A series of resin compositions was prepared as in Example 3 using as the additional ingredients those shown in Table VI.

TABLE VI

| Sample No. | Keto-acetic acid component of Stabilizer Composition | Initial Clarity and Color | Heat Discoloration at 350° F. after heating for— | | | | | | | | |
|---|---|---|---|---|---|---|---|---|---|---|---|
| | | | 0 mins. | 15 mins. | 30 mins. | 45 mins. | 60 mins. | 75 mins. | 90 mins. | 105 mins. | 120 mins. |
| A | 0.5 part of glyceryl tri-acetoacetate. | Clear | Clear | Clear | Very pale yellow. | Pale yellow. | Pale yellow. | Pale yellow. | Pale yellow. | Yellow | Charred. |
| B | 0.5 part glyceryl tri-acetoacetate, 0.5 part free glycerol. | Hazy | Hazy | Pale yellow. | Pale yellow. | Yellow | Dark yellow. | Dark yellow. | Darkened yellow with black streaks. | Black streaks. | Black streaks. |
| C | 0.5 part glyceryl tri-acetoacetate, 0.5 part mannitol. | ___do___ | ___do___ | ___do___ | Yellow | ___do___ | Yellow with black streaks. | Yellow with black streaks. | Yellow with black streaks. | Yellow with black streaks. | Yellow with black streaks. |
| D | 0.5 part 2-ethyl hexyl acetoacetate. | Clear | Clear | Clear | Pale yellow. | Pale yellow. | Pale yellow. | Yellow | Yellow | Dark yellow. | Charred. |
| E | 0.5 part 2-ethyl hexyl acetoacetate, 0.5 part free glycerol. | ___do___ | ___do___ | Pale yellow. | ___do___ | Yellow | Yellow | ___do___ | Dark yellow. | ___do___ | Dark yellow. |
| F | 0.5 part 2-ethyl hexyl acetoacetate, 0.5 part mannitol. | ___do___ | ___do___ | ___do___ | Yellow | ___do___ | Dark yellow. | Dark yellow. | ___do___ | ___do___ | Do. |

This test shows the relative ineffectiveness and in some cases, notably Example C and Example F, containing the mannitol, the unfavorable heat deterioration qualities resulting from the addition of additional free polyhydric alcohol to the clarifying additives included within the scope of this invention.

Example 5

To show that the salts of the keto acid anhydride dimers of this invention are not useful for improving clarity and color stability except in admixture with the keto acetic acid compound of the invention, the following tests were made. A series of compositions was prepared each containing 150 parts of Diamond 450 PVC homopolymer, 0.8 part zinc stearate, 0.7 part mannitol and 0.05 part 2,6-ditertiary butyl 4-methyl phenol blended on a two roll mill up to 375° F. plus the additives shown on Table VII. Each sample was then divided into two portions, one portion of each being heated at 350° F. and the second portion at 375° F. in an air oven to determine heat stability. The discoloration was noted and is reported in Table VII and Table VIII.

TABLE VII

| Sample No. | Keto-acetic acid component of Stabilizer Composition | Initial Clarity and Color | Heat Discoloration at 350° F. after heating for— | | | | | | |
|---|---|---|---|---|---|---|---|---|---|
| | | | 15 mins. | 30 mins. | 45 mins. | 60 mins. | 75 mins. | 90 mins. | 105 mins. |
| A | 0.5 part magnesium benzoate | Cloudy | Pale yellow. | Pale yellow. | Pale yellow. | Yellow | Charred | | |
| B | 0.5 part magnesium benzoate, 0.25 part dehydroacetic acid. | Clear, colorless. | Very pale yellow. | ___do___ | Yellow | ___do___ | Yellow | Charred | |
| C | 0.6 part magnesium dehydro acetate | Very cloudy, colorless. | Light yellow. | Yellow | ___do___ | Dark yellow. | Charred | | |
| D | 0.6 part calcium benzoate | Pink, slight haze. | Yellow | ___do___ | ___do___ | ___do___ | Dark yellow. | Dark yellow. | Charred. |
| E | 0.6 part calcium benzoate, 0.25 part dehydroacetic acid. | Clear, colorless. | Almost white. | Very pale yellow. | Pale yellow. | Pale yellow. | Yellow | ___do___ | Black. |
| F | 0.7 part calcium dehydro acetate | Very cloudy, slightly yellow. | Pale yellow. | Pale yellow. | Yellow | Dark yellow. | Slight charring. | Charring | |
| G | 0.6 part magnesium dehydro acetate, 0.25 part dehydroacetic acid. | Slight haze, colorless. | Very pale yellow. | ___do___ | ___do___ | Charred | | | |

TABLE VIII

| Sample No. | Keto-acetic acid component of Stabilizer Composition | Initial Clarity and Color | Heat Discoloration at 375° F. after heating for— | | |
|---|---|---|---|---|---|
| | | | 15 mins. | 30 mins. | 45 mins. |
| A | 0.5 part magnesium benzoate | Cloudy | Yellow | Charred | |
| B | 0.5 part magnesium benzoate, 0.25 part (DHAA) dehydroacetic acid. | Clear white | ___do___ | ___do___ | |
| C | 0.6 part magnesium dehydro acetate | Very cloudy | ___do___ | ___do___ | |
| D | 0.6 part calcium benzoate | Yellow | Dark yellow | Very dark yellow, with spots. | Charred. |
| E | 0.6 part calcium benzoate, 0.25 part DHAA | Very clear white | Yellow | Dark yellow | Black. |
| F | 0.7 part calcium dehydroacetate | Very cloudy, slightly yellow | ___do___ | Charred | |
| G | 0.6 part magnesium dehydroacetate, 0.25 part DHAA | Slight haze, colorless | Pale yellow | ___do___ | |

These tests show clearly that the color and clarity of the plastic resin compositions containing the dehydroacetic acid and the calcium and magnesium salt mixture of this invention is by far the best, and that the heat stability is at least as good and in most cases somewhat improved over the materials not containing the inventive clarity improving composition. The resin compositions containing the magnesium or calcium salt of dehydroacetic acid but not the dehydroacetic acid show a decline in heat stability and clarity, compared with the resins containing a mixture of the salts and the acid, as well as with the control resin composition.

Example 6

To the basic resin composition of Example 5 was added the salts of sodium and potassium benzoate, each alone and each in admixture with dehydroacetic acid. The results and quantities used are shown in Table IX.

TABLE IX

| Sample No. | Keto-acetic acid component of Stabilizer Composition | Initial Clarity and Color | Heat Discoloration at 350° F. after heating for— | | | | | | |
|---|---|---|---|---|---|---|---|---|---|
| | | | 15 mins. | 30 mins. | 45 mins. | 60 mins. | 75 mins. | 90 mins. | 105 mins. |
| A | Sodium benzoate 0.25 part | Yellowish, slightly hazy. | Light orange. | Orange. | Orange. | Light orange. | Light orange. | Light orange. | Black. |
| B | Sodium benzoate 0.25 part, dehydroacetic acid 0.25 part. | Clear, colorless | Almost clear. | Very pale yellow. | Pale yellow. | Pale yellow. | Yellow. | Black. | |
| C | Potassium benzoate 0.25 part | Yellowish, slight haze | Light orange. | ...do | ...do | ...do | Yellow | ...do | ...do |
| D | Potassium benzoate 0.25 part, dehydroacetic acid 0.25 part. | Clear, colorless | Almost clear. | ...do | ...do | ...do | ...do | ...do | ...do |

The results of this test show the efficacy of the clarifying additive with the alkali metal salts in the stabilizer composition of this invention.

*Example 7*

A series of resin compositions was prepared each containing 150 parts of Diamond 450 polyvinyl chloride homopolymer blended with mixed salts of barium and cadmium myristate 4.5 parts, and 0.1 part 2,6-ditertiary butyl 4-methyl phenol, plus the other stabilizers shown on Table X and Table XI on a two roll mill up to 375° F. Initial clarity for each sample was determined from a press polished sheet formed by pressing for 3 minutes at 375° F. Each sample was then divided into two portions; one portion of each being heated at 350° F., the second portion at 375° F. in an air oven to determine heat stability. The discoloration was noted and is reported in Table X and Table XI.

This example shows the effectiveness of our clarifying additive composition, the keto acetic acid esters, with a new formulation of resin. In addition, it shows the comparative ineffectiveness of pure glycerol as a clarity improver with this type of resin. Lally in U.S. Patent No. 2,711,401 discloses the use of an additive combining glycerol and a metal salt of a fatty acid. By adding glycerol, in this example, to the control formulation which contains the metal salt, the composition of Lally is obtained without any noticeable improvement in clarity.

*Example 8*

A series of resin compositions was prepared using 150 parts of Diamond 450 polyvinyl chloride homopolymer blended with a stabilizer composition made up of (based on weight of resin) 4.5 parts of the mixed salts of barium and cadmium myristate, 0.1 part 2,6-ditertiary butyl 4-methyl phenol plus the appropriate ingredient shown on Table XII and Table XIII. Blending and heat testing were done as in Example 7.

TABLE X

| Sample No. | Keto-acetic acid component of Stabilizer Composition | Initial Clarity and Color | Heat Discoloration at 350° F. after heating for— | | | | | | | |
|---|---|---|---|---|---|---|---|---|---|---|
| | | | 15 mins. | 30 mins. | 45 mins. | 60 mins. | 75 mins. | 90 mins. | 105 mins. | 120 mins. |
| A | Control I | Slightly pinkish, slightly hazy. | Light orange. | Orange. | Orange. | Dark orange. | Dark orange. | Dark orange. | Dark orange. | Very dark orange. |
| B | Control II [1] | Slight pink, hazier than A. | Light yellow. | Light yellow. | Light orange. | Light orange. | Light orange. | Orange. | ...do | Dark orange. |
| C | 0.75 part 2-ethyl hexyl acetoacetate. | Clear, colorless | Very light orange. | Light orange. | ...do | ...do | Orange. | ...do | ...do | Do. |
| D | 0.75 part glyceryl triacetoacetate. | Clear, slight pink | ...do | ...do | ...do | ...do | ...do | ...do | ...do | Do. |

[1] 0.75 part glycerol.

TABLE XI

| Sample No. | Keto-acetic acid component of Stabilizer Composition | Initial Clarity and Color | Heat Discoloration at 375° F. after heating for— | | | | | |
|---|---|---|---|---|---|---|---|---|
| | | | 15 mins. | 30 mins. | 45 mins. | 60 mins. | 75 mins. | 90 mins. |
| A | Control I | Slightly pinkish, slightly hazy | Light orange. | Orange. | Orange. | Orange. | Charred. | |
| B | Control II [1] | Slight pink, hazier than A | ...do | Light orange. | Light orange. | ...do | Dark orange. | Charred. |
| C | 0.75 part 2-ethyl hexyl acetoacetate. | Clear, colorless | Very light orange. | Orange. | Orange. | ...do | Dark orange with black flecks. | Do. |
| D | 0.75 part glyceryl triacetoacetate | Clear, slight pink | ...do | ...do | ...do | ...do | ...do | Do. |

[1] 0.75 part glycerol.

TABLE XII

| Sample No. | Keto-acetic acid component of Stabilizer Composition | Initial Clarity and Color | Heat Discoloration at 350° F. after heating for— | | | | | | | |
|---|---|---|---|---|---|---|---|---|---|---|
| | | | 15 mins. | 30 mins. | 45 mins. | 60 mins. | 75 mins. | 90 mins. | 105 mins. | 120 mins. |
| A | Control I | Slightly pinkish, slightly hazy. | Light orange. | Orange. | Orange. | Dark orange. | Dark orange. | Dark orange. | Dark orange. | Very dark orange. |
| B | Control II (1.5 parts octyl diphenyl phosphite). | Slight haze. | Yellow. | Yellow. | Yellow. | Yellow. | Yellow. | Yellow. | Yellow. | Yellow. |
| C | Control III (0.75 part octyl diphenyl phosphite). | Slighter yellow, slighter haze. | Light yellow. | ---do----- | ---do----- | Dark yellow. | Light orange. | Orange. | Orange. | Orange. |
| D | 0.75 part octyl diphenyl phosphite, 0.75 part glyceryl triaceto acetate. | Clear, colorless. | Very light yellow. | Light yellow. | ---do----- | Yellow. | Yellow. | Yellow. | Yellow. | Dark yellow. |

TABLE XIII

| Sample No. | Keto-acetic acid component of Stabilizer Composition | Initial Clarity and Color | Heat Discoloration at 375° F. after heating for— | | | | | | |
|---|---|---|---|---|---|---|---|---|---|
| | | | 15 mins. | 30 mins. | 45 min. | 60 min. | 75 mins. | 90 mins. | 105 min. |
| A | Control I | Slightly pinkish, slightly hazy. | Light orange. | Orange. | Orange. | Orange. | Charred. | | |
| B | Control II (1.5 parts octyl diphenyl phosphite). | Slight haze. | Yellow. | Yellow. | Yellow. | Yellow. | Dark yellow charring. | Charred. | |
| C | Control III (0.75 part octyl diphenyl phosphite). | Slighter yellow, slighter haze. | Light | ---do----- | ---do----- | ---do----- | Dark yellow. | Dark yellow, charred at edges. | Charred. |
| D | 0.75 part octyl diphenyl phosphite, 0.75 part glyceryl triaceto acetate. | Clear, colorless. | Very light yellow. | Light yellow. | ---do----- | ---do----- | ---do----- | Dark yellow beginning to char. | Do. |

This example shows the greater effectiveness of the compounds of this invention compared to the use of phosphite additives alone at both 350° and at 375° F., especially for the first hour at 350° F. and the first 15 minutes at 375° F. As may be seen from the comparison of the samples, adding a small amount of the glyceryl triacetoacetate to the phosphite mixtures tested increases the heat stability of the resin composition compared to using pure phosphite. It can be seen that when the same total weight of pure phosphite additive is used, compared with total weight of a mixture of the phosphite and keto acetic acid compound, the resin containing the mixture exhibits the best qualities.

*Example 9*

A series of resin samples was prepared using for each sample 100 parts of Geon 103 EP polyvinyl chloride homopolymer mixed with a stabilizer composition made up of (based on weight of resin) 2 parts of a 3:4:5 mixture of magnesium benzoate, zinc tallow fatty acid salts and mannitol plus the additives shown on Table XIV and Table XV. Blending and heat testing were done as in Example 7.

TABLE XIV

| Sample No. | Keto-acetic acid component of Stabilizer Composition | Initial Clarity and Color | Heat Discoloration at 350° F. after heating for— | | | | | | | |
|---|---|---|---|---|---|---|---|---|---|---|
| | | | 15 mins. | 30 mins. | 45 mins. | 60 mins. | 75 mins. | 90 mins. | 105 mins. | 120 mins. |
| A | Control I | Cloudy, pale yellow. | Pale yellow. | Yellow. | Yellow. | Yellow. | Yellow. | Yellow. | Charred. | |
| B | 0.25 part dehydroacetic acid (DHAA). | Clear. | Very pale yellow. | Pale yellow. | Pale yellow. | ---do---- | ---do---- | ---do------ | Black. | |
| C | Control II (1 part tris (nonyl phenyl) phosphite). | ---do------ | Pale yellow. | Yellow. | Yellow. | ---do---- | ---do---- | Black. | | |
| D | 0.25 dehydroacetic acid, 0.5 part tris (nonyl phenyl) phosphite. | Clear, colorless. | Very pale yellow. | Light yellow. | Light yellow. | ---do---- | ---do---- | Dark yellow. | Black. | |
| E | 0.25 part dehydroacetic acid, 1 part tris (nonyl phenyl) phosphite. | ---do------ | Almost colorless. | Very light yellow. | ---do---- | ---do---- | ---do---- | Beginning to char. | ---do---- | |
| F | 0.25 part dehydroacetic acid, 0.5 part glyceryl triacetoacetate. | Clear. | ---do------ | ---do---- | ---do---- | Pale yellow. | ---do---- | Black. | | |
| G | 0.25 part DHAA, 0.5 part glyceryl triacetoacetate, 1 part tris (nonyl phenyl) phosphite. | ---do------ | ---do------ | ---do---- | ---do---- | Yellow. | Beginning to char. | ---do------ | | |

TABLE XV

| Sample No. | Keto-acetic acid component of Stabilizer Composition | Initial Clarity and Color | Heat Discoloration at 375° F. after heating for— | | |
|---|---|---|---|---|---|
| | | | 15 mins. | 30 mins. | 45 mins. |
| A | Control I | Cloudy, pale yellow | Yellow | Dark yellow | Black. |
| B | 0.25 part dehydroacetic acid (DHAA) | Clear | Pale yellow | Turning black | Do. |
| C | Control II (1 part tris (nonyl phenyl) phosphite) | do | Yellow | Darkened yellow | Do. |
| D | 0.25 part dehydroacetic acid, 0.5 part tris (nonyl phenyl) phosphite | Clear, colorless | Very pale yellow | do | Do. |
| E | 0.25 part dehydroacetic acid, 1 part tris (nonyl phenyl) phosphite | do | do | Almost black | Do. |
| F | 0.25 part DHAA, 0.5 part glyceryl triacetoacetate | Clear | Pale yellow | Black | |
| G | 0.25 part DHAA, 0.5 part glyceryl triacetoacetate, 1 part tris (nonyl phenyl) phosphite | Clear, colorless | Very pale yellow | do | |

This example supplements Example 8 in showing the effectiveness of mixing another keto acetic acid compound with a different phosphite compared to using the pure phosphite.

*Example 10*

A series of resin samples was prepared each containing 100 parts of Geon 103 EP polyvinyl chloride homopolymer. Each sample was mixed with the additives shown in Table XVI, using the procedure of Example 7. The discoloration and clarity were noted using the same test procedure, and are reported in Table XVI.

above table, the addition of that salt decreases the heat stability and gives an inferior initial clarity and color when using two of the heat stabilizer formulations of the earlier examples without the composition of this invention. In addition, by substituting calcium ethyl aceto acetate salt for the calcium stearate of the heat stabilizer mixture of Sample C, the resultant resin composition has lower heat stability than when using the stearate salt, and further, the lower the proportion of the ethyl aceto acetate used, the better is the initial clarity and color.

TABLE XVI

| Sample No. | Stabilizer Composition | Initial Clarity and Color | Heat Discoloration at 350° F. after heating for— | | | | | | | |
|---|---|---|---|---|---|---|---|---|---|---|
| | | | 15 mins. | 30 mins. | 45 mins. | 60 mins. | 75 mins. | 90 mins. | 105 mins. | 120 mins. |
| A | 0.67 part magnesium benzoate, 0.67 part zinc stearate, 0.67 part mannitol. | Slightly cloudy | Very pale yellow. | Pale yellow. | Yellow | Yellow | Yellow | Yellow | Yellow | Slight charring at edges. |
| B | Calcium ethyl aceto acetate (CaEAA) 0.5 part, 0.67 part magnesium benzoate, 0.67 part zinc stearate, 0.67 part mannitol. | Yellowish, almost opaque. | Light orange. | Orange | Dark orange. | Dark orange. | Very dark orange. | Very dark orange. | Very dark orange. | Very dark black orange. |
| C | 0.67 part calcium stearate, zinc stearate, 0.67 part, plus sorbitol, 0.67 part. | Orange, slightly cloudy. | Orange | do | Orange | Orange | Orange | Light orange. | Light orange. | Orange with black specks. |
| D | CaEAA 0.67 part, zinc stearate 0.67 part, sorbitol 0.67 part. | Dark orange, very cloudy. | do | Dark orange. | Dark orange. | Very dark orange. | Very dark orange. | Dark orange with black flecks. | Dark orange with black flecks. | Charred. |
| E | CaEAA 0.33 part, zinc stearate 0.67 part, sorbitol 0.67 part. | Dark orange, cloudy. | do | Orange | Orange | Dark orange. | Dark orange. | Orange with black specks. | Charred | Black. |
| F | CaEAA 0.22 part, zinc stearate 0.67 part, sorbitol 0.67 part. | Light orange, slightly cloudy. | Light orange. | Light orange. | Light orange. | Light orange. | Light orange. | Light orange blk. specks. | Black | |

This example shows the adverse results caused by the addition of the calcium ethyl aceto acetate salt described in U.S. Patent No. 2,307,075. As may be seen from the

*Example 11*

A series of resin compositions was prepared each containing 100 parts Geon 103 EP vinyl chloride homo-

TABLE XVII

| Sample No. | Keto-acetic acid component of stabilizer composition | Initial clarity and color | Heat discoloration at 350° F. after heating for— | | | | | | | |
|---|---|---|---|---|---|---|---|---|---|---|
| | | | 15 mins. | 30 mins. | 45 mins. | 60 mins. | 75 mins. | 90 mins. | 105 mins. | 120 mins. |
| A | Control I | Pale yellow, cloudy. | Light yellow. | Yellow | Yellow | Yellow | Yellow | Light yellow. | Darkened yellow. | Charred. |
| B | 0.25 part benzoic acid (Control II). | Slightly cloudy, very pale yellow. | Very pale yellow. | Pale yellow. | do | do | do | Yellow | Dark yellow, black specks. | Do. |
| C | 0.5 part benzoic acid (Control III). | do | do | do | do | do | do | Dark yellow. | Charred | |
| D | 0.125 part dehydroacetic acid | Very slightly cloudy, very pale yellow. | do | do | Pale yellow. | do | do | Yellow | Darkened yellow. | Black. |
| E | 0.25 part dehydroacetic acid | Clear, very pale yellow. | do | Very pale yellow. | do | do | do | do | Black | |
| F | 0.25 part benzoic acid, 3.0 parts epoxidized soybean oil (Control IV). | Slightly cloudy, very pale yellow. | Pale yellow. | Pale yellow. | Yellow | do | do | do | do | Yellow |
| G | 0.5 part benzoic acid, 3.0 parts epoxidized soybean oil (Control V). | do | do | do | do | do | do | do | do | do |
| H | 0.125 part dehydroacetic acid, 3.0 parts epoxidized soybean oil. | Very slightly cloudy, very pale yellow. | do | do | Pale yellow. | do | do | do | do | | polymer blended with 0.5 part each of magnesium benzoate, 0.7 part zinc stearate, 0.8 part mannitol, plus other stabilizers as noted in Table XVII, on a two roll mill up to 375° F. Each sample was then heated at 350° F. in an air oven to determine heat stability. The discoloration was noted and is reported in Table XVII.

This example compares the effectiveness of the clarifying additive, dehydroacetic acid, with the clarifying effectiveness of a benzoic acid of a higher concentration. It can be seen that both with and without the addition of an epoxidized oil to the composition the DHAA gives a superior color to the resin without detracting substantially from the heat stability over the control composition (Sample A) and shows improved heat stability over the benzoic acid formulation (especially without the epoxidized oil).

*Example 12*

A series of resin compositions was prepared each containing 100 parts of Geon 103 EP vinyl chloride homopolymer blended with 2 parts of a 3:4:5 mixture of magnesium benzoate, zinc stearate and mannitol, 2 parts of peoxidized soybean oil, 1 part glyceryl monoricinoleate, 15 parts of acrylonitrile-butadiene-styrene terpolymer impact strength modifier and the other stabilizers noted in Table XVIII and Table XIX on a two roll mill up to 375° F. Such sample was then divided into two portions, one portion of each being heated at 350° F. and the second portion at 375° F. in an air oven to determine heat stability. The discoloration was noted and is reported in Table XVIII and Table XIX.

This example shows the effectiveness of the clarity improvers of this invention when used with the acrylonitrile butadiene styrene terpolymer impact improver. Since many plastics, especially of the rigid formulation useful in packaging, require an impact improver, this is a most useful quality. The effectiveness of the composition of this invention was shown by this test to improve the initial color and clarity of the plastic as well as the resistance to heat discoloration at the working temperatures, compared with resin compositions containing only a phosphite clarifier.

*Example 13*

A series of compositions was made up as in Example 2 employing as the polymer Geon 600, an after-chlorinated polyvinyl chloride resin. The same proportion of additives were used and the same tests were made. Similar advantages for the compositions of this invention were obtained with this type of plastic.

*Example 14*

Two sets of resin compositions were prepared using 100 parts by weight of Diamond 450 polyvinyl chloride homopolymer with 3.0 parts of epoxidized soya oil, 2 parts calcium benzoate and 1.1 part zinc stearate and the other ingredients shown in Table XX and Table XXI. A third pair of compositions was prepared in which 1.2 parts of calcium ethyl aceto acetate was substituted for 1.2 parts of calcium benzoate. Blending of the resin and heat tests were carried out as described in Example 7.

TABLE XVIII

| Sample No. | Keto acetic acid component of Stabilizer Composition | Initial Clarity and Color | Heat Discoloration at 350° F. after heating for— | | | | | | | |
|---|---|---|---|---|---|---|---|---|---|---|
| | | | 15 mins. | 30 mins. | 45 mins. | 60 mins. | 75 mins. | 90 mins. | 105 mins. | 120 mins. |
| A | Control I | Very slightly pale yellow, cloudy. | Pale yellow. | Yellow. | Yellow. | Dark yellow. | Light orange. | Orange. | Orange. | Dark orange. |
| B | 0.25 part dehydroacetic acid | Slightly cloudy. | Very light yellow. | Light yellow. | Light yellow. | Light yellow. | Yellow. | Yellow. | Dark yellow. | Light orange. |
| C | 0.5 part glyceryl triacetaacetate ester. | Pale yellow, slightly cloudy. | ---do---- | ---do---- | Yellow. | Yellow. | ---do---- | Light orange. | Light orange. | Orange. |
| D | 1 part tris (nonyl phenyl) phosphite Control II. | Very pale yellow, cloudy. | Light yellow. | ---do---- | Light yellow. | ---do---- | Light orange. | Orange. | Orange. | Dark orange. |
| E | 1 part tris (nonyl phenyl) phosphite, 0.25 part dehydroacetic acid. | Slightly cloudy, colorless. | Very light yellow. | ---do---- | ---do---- | Light yellow. | Light yellow. | Light yellow. | Light yellow. | Orange. |
| F | 1 part tris (nonyl phenyl) phosphite, 0.5 part glyceryl triacetoacetate. | Colorless, slightly cloudy. | ---do---- | Very light yellow. | ---do---- | ---do---- | Yellow. | Yellow. | ---do---- | Do. |

TABLE XIX

| Sample No. | Keto acetic acid component of Stabilizer Composition | Initial Clarity and Color | Heat Discoloration at 375° F. after heating for— | | | |
|---|---|---|---|---|---|---|
| | | | 15 mins. | 30 mins. | 45 mins. | 60 mins. |
| A | Control I | Pale yellow, cloudy. | Light orange. | Orange. | Dark orange. | Charred. |
| B | 0.25 part dehydroacetic acid | Slightly cloudy very pale yellow. | Pale yellow. | Yellow. | -----do------- | Black. |
| C | 0.5 part glyceryl triacetoacetate ester | Slightly cloudy pale yellow. | Light yellow. | ---do---- | -----do------- | Charred. |
| D | 1 part tris (nonyl phenyl) phosphite Control II | Very pale yellow, cloudy. | -----do------- | ---do---- | -----do------- | Do. |
| E | 1 part tris (nonyl phenyl) phosphite, 0.25 part dehydroacetic acid. | Slightly cloudy colorless. | -----do------- | ---do---- | -----do------- | Black. |
| F | 1 part tris (nonyl phenyl) phosphite, 0.5 part glyceryl triacetoacetate. | -----do--------------- | -----do------- | ---do---- | Orange. | Do. |

Heat discoloration test results are given in Table XX and Table XXI.

clarifier containing systems. It is also shown that the heat stability of the composition of this invention is at least as

TABLE XX

| Sample No. | Keto-acetic acid component of Stabilizer Composition | Initial Clarity and Color | Heat Discoloration at 350° F. after heating for— | | | | | | | |
|---|---|---|---|---|---|---|---|---|---|---|
| | | | 15 mins. | 30 mins. | 45 mins. | 60 mins. | 75 mins. | 90 mins. | 105 mins. | 120 mins. |
| A | Control I | Pale yellow, slightly cloudy. | Yellow | Yellow | Yellow | Yellow | Amber | Brown | Charred | |
| B | 1.0 part glyceryltriacetoacetate. | Very pale yellow, very slightly cloudy. | Pale yellow. | Pale yellow. | ---do----- | ---do----- | Deep amber. | ---do----- | ---do----- | |
| C | Control II (calcium ethyl acetoacetate replacing calcium benzoate). | Very pale yellow, milky. | Very pale yellow. | Very pale yellow. | Pale yellow. | Pale yellow. | Yellow | Deep amber. | Brown | Charred. |

TABLE XXI

| Sample No. | Keto acetic acid component of Stabilizer Composition | Initial Clarity and Color | Heat Discoloration at 375° F. after heating for— | | | |
|---|---|---|---|---|---|---|
| | | | 15 mins. | 30 mins. | 45 mins. | 60 mins |
| A | Control I | Pale yellow, slightly cloudy. | Light yellow | Charred | | |
| B | 1.0 part glyceryltriaceto acetate | Very pale yellow, very slightly cloudy. | -----do--------- | -----do-------- | | |
| C | Control II (calcium ethyl acetoacetate replacing calcium benzoate). | Very pale yellow, milky. | -----do--------- | Deep amber | Charred | |

This example shows the effectiveness of the keto acetic acid compounds of this invention as a clarifier when combined with still another heat stabilizer mixture. It also gives further evidence of the unsuitability of the calcium salt of the keto acetic acid compounds as clarifiers.

*Example 15*

A series of resin compositions was prepared each containing 150 parts of Solvic 229 polyvinyl chloride homopolymer blended with a 3:4:5 mixture of magnesium benzoate, zinc stearate and mannitol, plus the additives shown in Table XXII. The preparatory and test procedures of Example 7 were used.

good and in one case improved over that of the prior art composition.

*Example 16*

A series of resin compositions was prepared from chlorinated polyethylene containing 44% chlorine as follows:

| | A | B | C | D | E |
|---|---|---|---|---|---|
| Chlorinated polyethylene (44% chlorine) | 100 | 100 | 100 | 100 | 100 |
| Zinc stearate | 0.67 | 0.67 | 0.67 | 0.67 | 0.67 |
| Mannitol | 0.67 | 0.67 | 0.67 | 0.67 | 0.67 |
| 2,6-ditertiary butyl 4-methyl phenol | 0.05 | 0.05 | 0.05 | 0.05 | 0.05 |
| Magnesium benzoate | 0.67 | | | | |
| Magnesium dehydroacetate | | 0.67 | 0.67 | | |
| Dehydroacetic acid | | | | 0.25 | 0.25 | 0.25 |

TABLE XXII

| Sample No. | Keto-acetic acid component of Stabilizer Composition | Initial Clarity and Color | Heat Discoloration at 350° F. after heating for— | | | | | | | |
|---|---|---|---|---|---|---|---|---|---|---|
| | | | 15 mins. | 30 mins. | 45 mins. | 60 mins. | 75 mins. | 90 mins. | 105 mins. | 120 mins. |
| A | Control I | Slightly cloudy, very light orange color. | Very light orange. | Light orange. | Light orange. | Light orange. | Light orange. | Light orange. | Light orange. | Light orange. |
| B | 0.375 part dehydroacetic acid | Very slightly cloudy, colorless. | Very light yellow. | Light yellow. | Yellow | Yellow | Yellow | Yellow | Yellow | Yellow. |
| C | 0.75 part ethylene glycol 3-aminocrotonate (Control II). | Pale yellow, slightly cloudy. | ---do----- | ---do----- | Light yellow. | ---do----- | ---do----- | ---do----- | ---do----- | Dark yellow. |
| D | n-phenyl indole (0.75 part (Control III). | Colorless, slightly cloudy. | Very pale | Pale yellow | Pale yellow. | Pale yellow. | Pale yellow. | Pale yellow. | Pale yellow. | Yellow. |
| E | 0.75 part diphenyl thiourea (Control IV). | Canary yellow, slightly cloudy. | Yellow | Yellow | Orange | Darker orange. | Red | Charred | | |

This series of tests compares the use of the keto acetic acid compounds of this invention as a clarifier compared with the use of other systems which have been previously tried. As can be seen from Table XXII, the initial clarity and color of the system containing the keto acetic acid compound of this invention shows a marked improvement in the initial color and clarity over that of the other three Similar advantages for the mixture of magnesium salts with the dehydroacetic acid as clarifying and stabilizing additives were shown as in Example 5. The uselessness of the magnesium salt of dehydroacetate as a clarifier compared with the mixture of the dehydroacetic acid with a magnesium salt was also shown in this case for chlorinated polyethylene.

Example 17

A series of compositions was prepared as follows:

|  | A | B | C | D |
|---|---|---|---|---|
| Copolymer of 90% vinyl chloride, 10% vinyl acetate | 100 | 100 | 100 | 100 |
| Zinc stearate | 0.67 | 0.67 | 0.67 | 0.67 |
| Mannitol | 0.67 | 0.67 | 0.67 | 0.67 |
| 2,6 ditertiary butyl 4-methyl phenol | 0.05 | 0.05 | 0.05 | 0.05 |
| Magnesium benzoate | 0.67 | 0.67 | | |
| Magnesium dehydroacetate | | | 0.67 | 0.67 |
| Dehydroacetic acid | | 0.25 | | 0.25 |

Similar tests were made as in Example 5 comparing the stabilizing and clarifying effectiveness of the mixtures shown in the accompanying table. Similar advantages were obtained in the use of the composition of this invention with the copolymer of vinyl chloride and vinyl acetate as were obtained with the homopolymer of vinyl chloride and the chlorinated polyethylene resins of Examples 5 and 16 as compared with the use of the salt of dehydroacetate as an additive alone.

Example 18

A series of compositions was prepared comprising 100 parts Dow 100–4 homopolymer of polyvinyl chloride, 45 parts dioctyl phthalate, 0.75 part barium nonyl phenate, 0.375 part cadmium 2 ethyl-hexanoate and the other additives shown in Table XXIII. These mixtures were blended as above and heated to 350° F. in an air oven to test the discoloration effect. Table XXIII sets forth the results of these tests.

Table XXIII shows the effectiveness of the compositions of this invention with a PVC polymer containing phenate additives. As may be seen, the compositions improve initial clarity considerably without any significant decrease in heat stability over the long periods required for working some polyvinyl chloride polymers.

Example 19

Resin compositions were prepared using 100 parts of Diamond 450, a homopolymer of polyvinyl chloride, with a heat stabilizer made from (based on weight of resin) 1.2 parts of calcium benzoate, 1.1 parts of zinc stearate, 1.0 part of sorbitol and, in the second sample, 0.17 part of dehydroacetic acid. Blending and heat testing were done as in Example 7. Heat test discoloration is set out in Table XXIV and Table XXV.

TABLE XXIII

| Sample No. | Keto-acetic acid Component of Stabilizer Composition | Initial Clarity and Color | Heat Discoloration at 350° F. after heating for— | | | | | | | |
|---|---|---|---|---|---|---|---|---|---|---|
| | | | 15 mins. | 30 mins. | 45 mins. | 60 mins. | 75 mins. | 90 mins. | 105 mins. | 120 mins. |
| A | Control | Colorless, very slightly cloudy. | Almost colorless. | Almost colorless. | Very pale yellow. | Very pale yellow. | Very pale yellow. | Very pale yellow. | Very pale yellow. | Pale yellow. |
| B | 0.15 part dehydroacetic acid | Colorless, clear | do | do | Almost colorless. | Almost colorless. | Bright yellow. | Bright yellow. | Bright yellow. | Bright yellow. |
| C | 0.75 part amyl benzoyl acetate. | Clear, colorless | Very light yellow. | Light yellow. | Light yellow. | Light yellow. | Light yellow. | Yellow | Yellow | Yellow. |

TABLE XXIV

| Sample No. | Keto-acetic acid Component of Stabilizer Composition | Initial Clarity and Color | Heat Discoloration at 350° F. after heating for— | | | | | | | |
|---|---|---|---|---|---|---|---|---|---|---|
| | | | 15 mins. | 30 mins. | 45 mins. | 60 mins. | 75 mins. | 90 mins. | 105 mins. | 120 mins. |
| A | Control | Pink, slightly hazy. | Light orange. | Orange | Orange | Orange | Orange | Orange with spots. | Orange with spots. | Orange with spots. |
| B | 0.17 part dehydroacetic acid | Pale pink, clear | Yellow | Yellow | Amber | Amber | Amber | Amber with spots. | Amber with spots. | Amber with spots. |

TABLE XXV

| Sample No. | Keto-acetic Acid Component of Stabilizer Composition | Initial Clarity and Color | Heat Discoloration at 375° F. after heating for— | | | | | |
|---|---|---|---|---|---|---|---|---|
| | | | 15 mins. | 30 mins. | 45 mins. | 60 mins. | 75 mins. | 90 mins. |
| A | Control | Pale pink, slightly hazy | Orange | Amber with spots. | Amber with spots. | Amber with spots. | Strongly spotted. | Charred. |
| B | 0.17 part dehydroacetic acid | Pale pink, clear | Yellow | Yellow | do | do | Amber with spots. | Do. |

This example shows the clarifying effectiveness of the keto acetic acid compound with the heat stabilizer of U.S. Patent No. 3,004,000.

*Example 20*

A series of resin compositions was prepared using 100 parts Diamond 450 polyvinyl chloride homopolymer plus a heat stabilizer comprising a 3:4:5 parts (based on weight of resin) mixture of magnesium benzoate, zinc stearate and mannitol plus the compound shown in Table XXVI. Blending and heat testing at 350° F. were done as in Example 7. Heat test discoloration is set out in Table XXVI.

TABLE XXVI

| Sample No. | Keto-acetic Acid Component of Stabilizer Composition | Initial Clarity and Color | Heat Discoloration at 350° F. after heating for— | | | | | | | |
|---|---|---|---|---|---|---|---|---|---|---|
| | | | 15 mins. | 30 mins. | 45 mins. | 60 mins. | 75 mins. | 90 mins. | 105 mins. | 120 mins. |
| A | Control | Pale pink, slightly hazy. | Pale yellow. | Light yellow. | Yellow | Yellow | Yellow | Edges charred. Yellow. | Charred | |
| B | 0.2 part iso-dehydroacetic acid. | Colorless, clear | do | do | Light yellow. | do | do | | Amber | Charred. |

This example shows the effectiveness of the iso-dehydroacetic acid compound as a clarifying agent.

*Example 21*

Two resin composition samples were prepared from 100 parts of Diamond 450 polyvinyl chloride homopolymer. The heat stabilizer mixture added to the first sample contained (based on weight of resin) 1.8 parts of glycerol, 0.75 part calcium benzoate and 0.45 part zinc stearate as described in U.S. Patent No. 3,003,998. The stabilizer added to the second example was made up of the material of the first plus 0.33 part dehydroacetic acid. The mixtures were blended as in Example 7 and a press polished sheet was made of each formulation by pressing for three minutes at 375° F. to determine initial clarity and color.

The first sample, without the dehydroacetic acid, was slightly hazy and yellow; the second sample, containing the dehydroacetic acid, was clear and only slightly yellow.

The following is claimed:

1. A polyvinyl chloride stabilizer composition capable of improving the initial clarity and resistance to deterioration when heated at 350° F. of polyvinyl chloride resins, consisting essentially of a nitrogen-free keto acetic acid compound having at least 8 carbon atoms, selected from the group consisting of keto acetic acid esters having the formula:

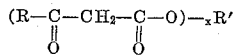

wherein R is an inert organic group having from one to about thirty carbon atoms, R' is an inert organic radical having from one to about thirty carbon atoms, and $x$ is a number from one to ten; and acid anhydride dimers having the formula selected from the group consisting of:

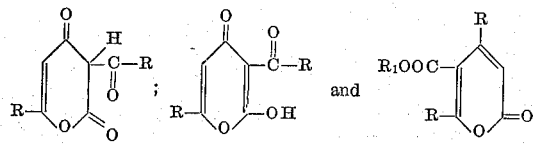

wherein $R_1$ is selected from the group consisting of hydrogen and R', and R and R' are as above; and a metal compound selected from the group consisting of the alkali and alkaline earth metal salts of non-nitrogenous monocarboxylic organic acids having from six to twenty-four carbon atoms, except in the case of alkali and alkaline earth metal salts of keto acetic acids, having from four to thirty-three carbon atoms, and of hydrocarbon-substituted phenols having from about four to about twenty-four carbon atoms in the hydrocarbon group, the keto acetic acid compound being present in an amount sufficient to enhance the initial clarity and color of any resin stabilized by the metal compound.

2. A polyvinyl chloride resin stabilizer composition in accordance with claim 1 comprising a second salt of a polyvalent metal selected from the group consisting of magnesium, barium, calcium, strontium, cadmium, lead, tin, zinc, antimony, manganese, bismuth, iron, cobalt, nickel and copper and an organic acid.

3. A polyvinyl chloride resin stabilizer composition in accordance with claim 1 in which the keto acetic acid compound is a keto acetic acid ester of an alcohol.

4. A polyvinyl chloride resin stabilizer composition in accordance with claim 3 wherein the alcohol is a monohydric alcohol.

5. A polyvinyl chloride resin stabilizer composition in accordance with claim 3 wherein the alcohol is an aliphatic polyol.

6. A polyvinyl chloride resin stabilizer composition in accordance with claim 1 in which the keto acetic acid compound is a dehydroacetic acid.

7. A polyvinyl chloride resin stabilizer composition in accordance with claim 1 wherein the metal compound is a metal phenolate of a hydrocarbon-substituted phenol.

8. A polyvinyl chloride resin stabilizer composition in accordance with claim 1 wherein the keto acetic acid compound and the metal salt are both non-toxic.

9. A polyvinyl chloride resin stabilizer composition in accordance with claim 1 containing as an additional polyvinyl chloride resin stabilizer an organic phosphite.

10. A polyvinyl chloride resin stabilizer composition in accordance with claim 1 containing as an additional polyvinyl chloride resin stabilizer an organic phenol.

11. A polyvinyl chloride resin stabilizer composition in accordance with claim 1 comprising in addition an epoxy ester having from 22 to 150 carbon atoms.

12. A polyvinyl chloride resin composition having improved initial clarity and resistance to deterioration when heated at 350° F., consisting essentially of a polyvinyl chloride resin and a stabilizer composition in accordance with claim 1 in a stabilizing amount.

13. A polyvinyl chloride resin composition in accordance with claim 12 in which the polyvinyl chloride resin is a vinyl chloride homopolymer.

14. A polyvinyl chloride resin composition in accordance with claim 12 in which the polyvinyl chloride resin is a copolymer of vinyl chloride and vinyl acetate.

15. A polyvinyl chloride resin composition in accordance with claim 12 in which the polyvinyl chloride resin contains a minor portion of chlorinated polyethylene having a chlorine content of at least 40%.

16. A polyvinyl chloride resin composition in accordance with claim 12 in which the polyvinyl chloride resin is an after-chlorinated polyvinyl chloride.

(References on following page)

References Cited

UNITED STATES PATENTS

| | | | |
|---|---|---|---|
| 2,307,075 | 1/1943 | Quattlebaum et al. | 260—45.75 |
| 2,476,829 | 7/1949 | Le Claire | 260—45.85 |
| 2,550,439 | 4/1951 | Adelman | 260—483 |
| 2,669,548 | 2/1954 | Darby | 260—45.75 |
| 2,948,747 | 8/1960 | Karbum et al. | 260—483 |
| 3,075,940 | 1/1963 | Pazinski | 260—23 X |
| 3,157,682 | 11/1964 | Ramsden | 260—483 |

FOREIGN PATENTS 214,657  4/1961  Australia.

DONALD E. CZAJA, *Primary Examiner.*

LEON J. BERCOVITZ, *Examiner.*

G. W. RAUCHFUSS, V. P. HOKE, *Assistant Examiners.*

UNITED STATES PATENT OFFICE
CERTIFICATE OF CORRECTION

Patent No. 3,346,536                  October 10, 1967

Otto S. Kauder et al.

It is hereby certified that error appears in the above numbered patent requiring correction and that the said Letters Patent should read as corrected below.

Column 7, line 67, for "adition" read -- addition --; column 8, line 28, for "y1 and y2" read -- $y_1$ and $y_2$ --;

line 29, for "n1 and n2" read -- $n_1$ and $n_2$ --; column 9, lines 40 to 43, the formula should appear as shown below instead of as in the patent:

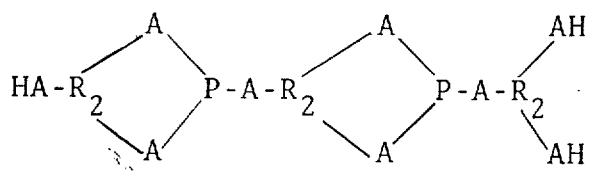

column 10, line 1, for "de-(o-isooctyl-" read -- di-(o-isooctyl- --; line 2, for "di(p-2-ethyhexyphenyl)" read -- di(p-2-ethylhexylphenyl) --; line 37, for "Patent" read -- Patents --; columns 17 and 18, TABLE X, seventh column, line 6 thereof, for "do" read -- Orange --; columns 19 and 20, TABLE XIII, fourth column, line 4 thereof, for "Light" read -- Light yellow --; columns 21 and 22, TABLE XVII, fourth column, lines 11 and 12 thereof, for "do", each occurrence, read -- Very pale yellow --; column 23, line 26, for "Such" read -- Each --; column 24, line 16, for "proportion" read -- proportions --; columns 25 and 26, TABLE XXII, fourth column, lines 8 and 9 thereof, for "Very pale" read -- Very pale yellow --.

Signed and sealed this 6th day of May 1969.

(SEAL)
Attest:

EDWARD M. FLETCHER, JR.
Attesting Officer

Commissioner of Patents